United States Patent [19]

Kimura et al.

[11] Patent Number: 4,775,904

[45] Date of Patent: Oct. 4, 1988

[54] CASSETTE LOADING DEVICE

[75] Inventors: Takashi Kimura; Akio Iwasaki; Akira Tomitaka, all of Kanagawa, Japan

[73] Assignee: Canon Kabushiki Kaisha, Tokyo, Japan

[21] Appl. No.: 898,316

[22] Filed: Aug. 20, 1986

[30] Foreign Application Priority Data

Aug. 22, 1985 [JP] Japan .................................. 60-184597
Sep. 13, 1985 [JP] Japan .................................. 60-203035

[51] Int. Cl.$^4$ ................................................ G11B 15/00
[52] U.S. Cl. ..................................... 360/85; 360/96.5
[58] Field of Search .................................... 360/84-85, 360/96.5-96.6; 242/198-200

[56] References Cited

U.S. PATENT DOCUMENTS 4,484,240  11/1986  Yoshida .............................. 360/96.5

Primary Examiner—A. J. Heinz
Attorney, Agent, or Firm—Robin, Blecker & Daley

[57] ABSTRACT

A cassette loading device having a cassette holding member arranged to be shiftable between a first position in which the cassette is attachable and detachable and a second position in which the cassette is stayed in a state of allowing use of a recording medium disposed within the cassette; to limit the movement of a cassette pushing member when the holding member is in the first position; and to remove the limitation when the holding member is in the second position.

18 Claims, 4 Drawing Sheets

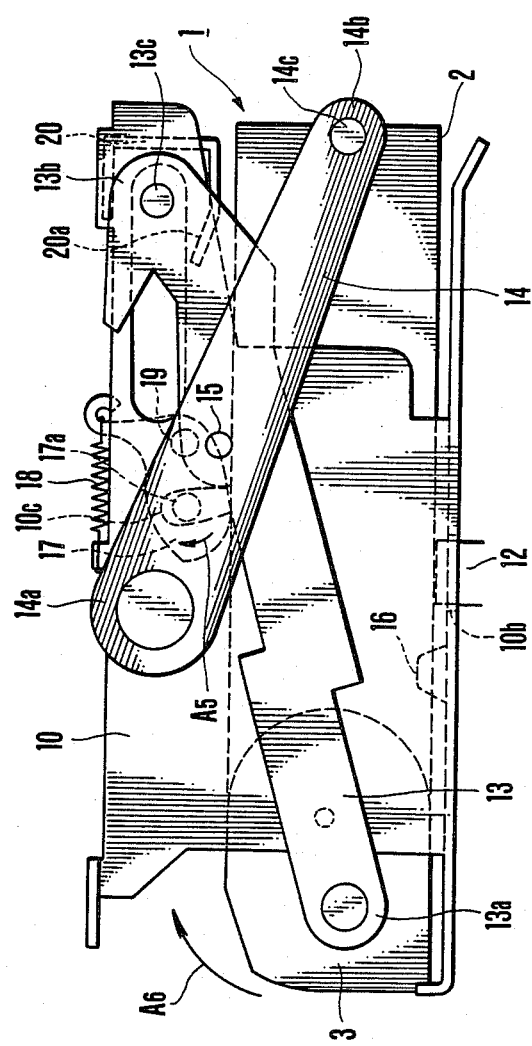

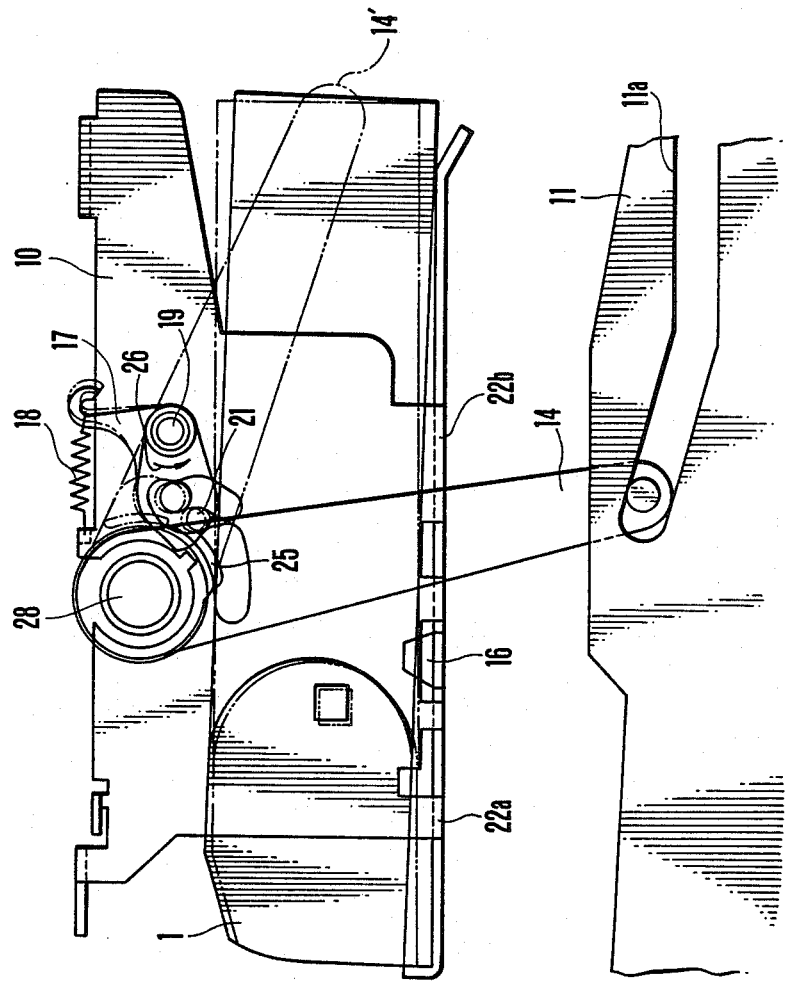

CASSETTE LOADING DEVICE

BACKGROUND OF THE INVENTION

1. Field of the Invention

This invention relates to a cassette loading device and more particularly to a device having a cassette holding member arranged to be shiftable between a first position in which the cassette is attachable to and detachable from the holding member and a second position in which the cassette is stayed in a state of allowing use of a recording medium disposed within the cassette.

2. Description of the Related Art

Heretofore, in many of video cassette recorders (hereinafter referred to as VCR), cassette holders have been provided with some means for preventing incorrect insertion of a tape cassette from the rear end thereof or in a reversed state. For example, it is known to provide a notched part in the lower side of the cassette in such a way as to extend in the cassette inserting direction and to open only on the front side. Meanwhile, the cassette holder is provided with a projection which is arranged on th bottom plate thereof to plunge into the above-stated notched part of the cassette. With the cassette holder arranged in this manner, the projection of the holder plunges into the notched part of the cassette to permit the cassette to be inserted into the holder only when the cassette is correctly inserted. In the event of an incorrectly inserting attempt, an end part of the cassette abuts on the projection to prevent the insertion.

Meanwhile, if the position of the upper surface of the cassette is entirely unrestricted in relation to the cassette holder, the cassette might be incorrectly inserted into the holder by riding over the projection of the latter. To avoid this trouble, therefore, the position of the upper surface of the cassette is generally restricted relative to the cassette holder. However, with such positional restriction imposed, not only the incorrect insertion but also the correct insertion of the cassette must be carried out under this restriction. As a result, latitude in allowing the vertical movement of the cassette relative to the holder is limited in this instance. In other words, the latitude is not allowed to exceed the depth of the notched part provided in the cassette.

In carrying out a recording or reproducing operation on a tape with an apparatus such as a VCR by pulling out the tape from the cassette, it is necessary to accurately set the cassette in position relative to the base plate of the apparatus. To meet this requirement, it has been practiced to precisely position the cassette relative to the apparatus by means of a positioning member mounted on the chassis of the apparatus. In that instance, with the latitude limited in allowing the cassette to move in the vertical direction relative to the holder as mentioned above, the cassette holder also must be positioned on the body of the apparatus in a degree of precision corresponding to the depth of the above-stated noched part. This means a requirement for an extremely high degree of machining precision. Further, to meet that requirement, it is necessary to use some rigid material for the body of the holder at the expense of a desire to reduce the weight of the apparatus.

Further, in positioning the cassette holder on the apparatus body, an engaging part which is arranged on the side of the holder to be urged toward the cassette inserting position from the cassette using position thereof is locked to the apparatus body in general. However, in order to lock the engaging part, the cassette holder must be once moved passing over the cassette using position (over-stroke). The extent of this over-stroke is determined also by the above-stated latitude allowed to the vertical movement of cassette within the cassette holder.

Generally, the cover of the cassette is arranged to be automatically pushed up when the cassette holder is pushed down from a cassette inserting position to a cassette using position. However, if the cassette holder is suddenly pushed down by hand without having the above-stated position restricting arrangement, the cassette might be moved upward by the above-stated cover lifting force away from the bottom plate of the cassette holder within the holder. In that instance, if the cassette is moved in parallel with the bottom plate even to a slight extent, the cassette rides on the above-stated projection. Under such a condition, even if the cassette holder is in the cassette using position, the tape does not satisfactorily travel because the reel hub of the cassette fails to perfectly engage the reel of the VCR. Further, in that event, the tape tends to be damaged by an inaccurately positioned state of the tape relative to a capstan, etc.

SUMMARY OF THE INVENTION

It is a general object of this invention to provide a cassette loading device which solves the above-stated problems of the prior art.

It is a more specific object of this invention to provide a cassette loading device which is capable of bringing a restriction placed on the movement of a cassette into a desired state according to the position of the cassette to be used.

It is another specific object of this invention to provide a cassette loading device which is arranged to permit reduction in weight of a cassette holding member.

It is a further object of this invention to provide a cassette loading device which is capable of preventing a cassette from being incorrectly inserted without damaging the cassette and a recording medium.

Under these objects, a cassette loading device which is arranged according to this invention as an embodiment thereof comprises: a cassette holding member arranged to hold a cassette which contains a recording medium therein, the holding member being shiftable between a first position in which the cassette is attachable to and detachable from the holding member and a second position in which the holding member stays the cassette in a state of permitting the use of the recording medium; a pressing member which is urged to press the cassette against the cassette holding member when the holding member is holding the cassette; and a movable member which is arranged to restrict the movement of the pressing member when the cassette holding member is in the first position and to undo the restriction when the cassette holding member is in the second position.

Further objects and features of this invention will become apparent from the following detailed description of preferred embodiments thereof taken in connection with the accompanying drawings.

BRIEF DESCRIPTION OF THE DRAWINGS

FIGS. 2(a) and 2(b) are illustrations showing a cassette loading device arranged as an embodiment of this invention.

FIG. 3 is an illustration of a cassette loading device arranged as another embodiment of this invention.

DETAILED DESCRIPTION OF THE PREFERRED EMBODIMENTS

Figure 1A:
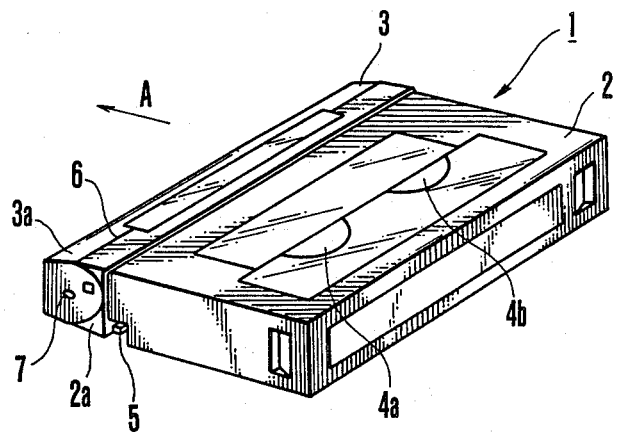
FIGS. 1(a) and 1(b) are oblique views showing a tape cassette to be handled with the cassette loading device embodying this invention.
Figure 1B:
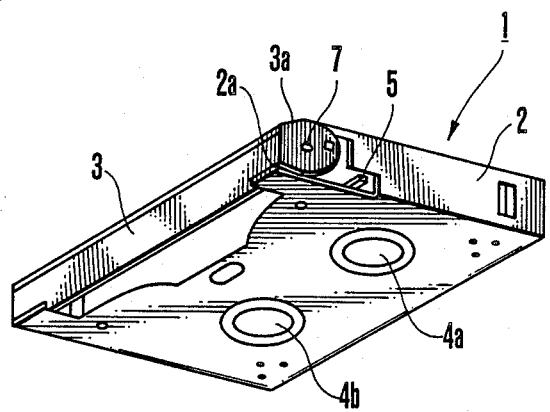

A magnetic tape cassette to which an embodiment of this invention is applicable is arranged as described below with reference to FIGS. 1(a) and 1(b):

A reference numeral 1 denotes the whole cassette. The cassette 1 comprises a cassette body 2; a turnable lid 3 which is turnably mounted on a shaft 7 in the front part of the cassette body 2 and is arranged to cover an opening provided for drawing a tape to the outside of the cassette. Normally, the lid 3 is in a closed state and is locked by a lock claw which is not shown. The lock claw is connected to an unlocking operation member 5, which faces an insertion restricting groove 2a. The insertion restricting groove 2a is formed in the cassette inserting direction A from the fore end side of the cassette to a point a little beyond the turnable lid 3 on the left side of the cassette body 2. The turnable lid 3 is provided with a tapered face 3a which is sloped down toward the front in the direction A of inserting the cassette 1. Reference numerals 4a and 4b denote tape reels. A numeral 6 denotes a clearance provided between the cassette body 2 and the lid 3 (FIG. 1(a)).

Figure 2A:
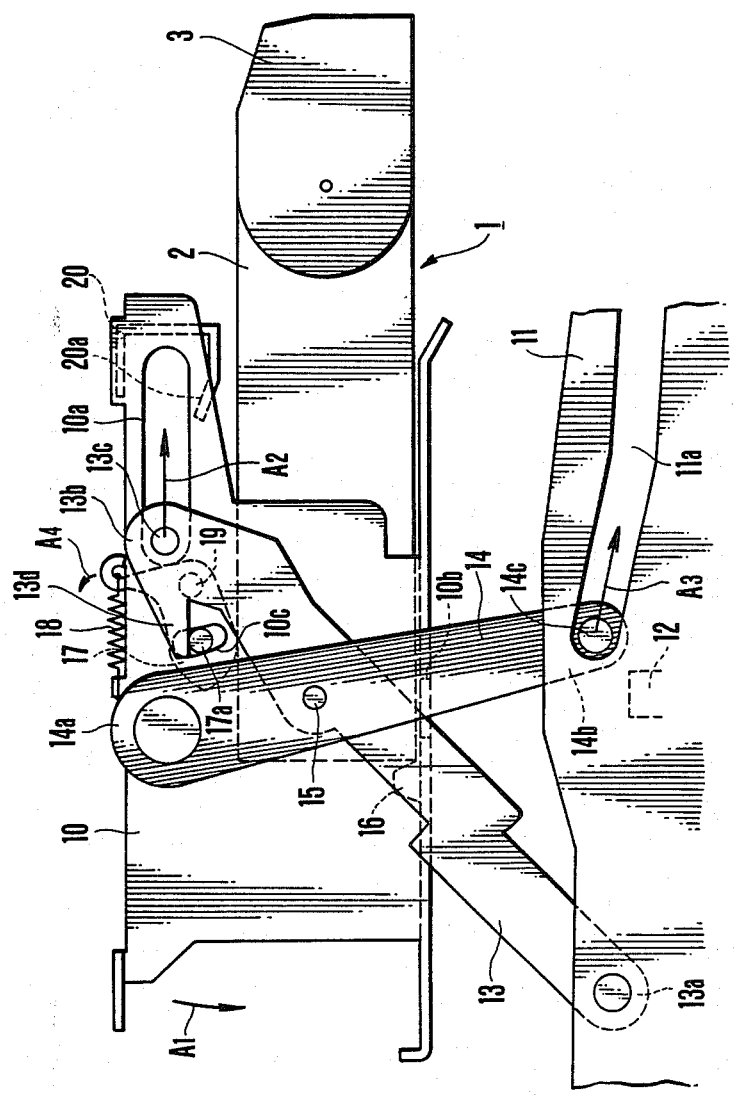

Referring now to FIGS. 2(a) and 2(b), a cassette loading device which embodies this invention and is applicable to the tape cassette described above is arranged as follows: FIG. 2(a) shows the details of a cassette holder of the device as in a tape cassette inserting position thereof. FIG. 2(b) shows the cassette holder as in a tape cassette using position. These illustrations include a cassette holder body 10; a frame 11 which is secured to the chassis of an apparatus such as a VCR; a positioning member 12 which is secured to the chassis and is provided for positioning the cassette relative to the chassis; levers 13 and 14 which are provided for moving the cassette holder body 10 from the cassette inserting position to the cassette using position respectively. One end 13a of the lever 13 is secured to the frame 11 while the other end 13b is provided with a projection 13c which is arranged to be shiftable along a slot 10a provided in the holder body 10, so that the lever 13 is movable relative to the holder body 10. One end 14a of the other lever 14 is secured to the holder body 10 while the other end 14b is provided with a projection 14c which is shiftable along a slot 11a provided in the frame 11, so that the lever 14 is movable relative to the frame 11. Further, the levers 13 and 14 are pivotally interconnected by means of a joint 15.

When the holder body 10 is moved from the position as shown in FIG. 2(a) in the direction of arrow A1, the projection 13c moves within the slot 10a in the direction of arrow A2 while the projection 14c moves within the slot 11a in the direction of arrow A3. The holder body 10 is urged to move upward as viewed on the drawing relative to the frame, though the urging arrangement is not shown. The urging force causes the holder (body 10 to shift from the cassette inserting position to the cassette using position thereof. The frame 11 is omitted from the illustration of FIG. 2(b).

In the event of an attempt to incorrectly insert the cassette 1 while the holder is in the cassette inserting position as shown in FIG. 2(a), the fore end of the cassette 1 comes to abut on a projection 16 in the cassette inserting direction. Meanwhile, a pushing member 17 is arranged to push the upper surface of the cassette 1 downward. The member 17 is pivotally attached to the holder body 10 and is urged by a spring 18 in the direction of arrow A4 and thus pushes the upper surface of the cassette 1 downward. A projection 17a which is provided on the pushing member 17 protrudes to the outside through an elliptic window 10c of the holder body 10. When the projection 17a moves and comes to abut on a hooked part 13d of the lever 13 with the holder in the cassette inserting position, the projection is inhibited from moving further. In other words, the position of the pushing member 17 is restricted by the hooked part 13d of the lever 13 formed as shown in FIG. 2(a). This arrangement of the projection 16 and the pushing member 17 effectively prevents the cassette 1 from being incorrectly inserted.

With the cassette Iccorrectly inserted, when the cassette holder 10 moves to the cassette using position, a positioning member 12 abuts on the lower surface of the cassette 1 via an opening 10b provided in the bottom of the holder. This accurately positions the cassette 1 relative to the chassis of the apparatus. In this instance, the restriction imposed on the position of the pushing member 17 by the hooked part 13d has been removed by the movement of the lever 13. Under that condition, the pushing member 17 is turnable within a range allowed by the elliptic window 10c.

The arrangement described effectively and reliably prevents the cassette 1 from being incorrectly inserted with the holder in the cassette inserting position. In addition to this advantage, the degree of latitude allowed in the vertical position of the cassette relative to the holder body 10 increases in the cassette using position. Therefore, the cassette 1 can be reliably set in position without any severe requirement for precision of the locked position of the holder 10 relative to the chassis of the apparatus. Besides, the various parts of the holder can be simplified and arranged to be in a lighter weight as a greater over-stroke becomes allowable by virtue of the arrangement.

The cassette holder is provided with an upper plate 20 for restricting the cassette inserting direction. The plate 20 has an upturned part 20a as shown in the drawing. This upturned part 20a is provided for the purpose of eliminating the possibility that, if the turnable lid 3 is not completely closed in taking out the cassette, the lid 3 contacts with the upper plate 20 to prevent the cassette from being taken out.

FIG. 3 shows another cassette loading device which is arranged as another embodiment of this invention. In FIG. 3, the same reference numerals are used as those used in FIGS. 1(a), 1(b), 2(a) and 2(b). The illustration includes a cassette holder body 10; and a turnable lever 14 which has one end thereof turnably attached to the holder body 10. When the holder body 10 is pushed downward, the lever 14 turns round counterclockwise. clockwise. The other end of the lever 14 then moves along a slit 11a provided in a frame 11 which is secured to the body of an apparatus such as a VCR or the like. Accordingly, the lever 14 shifts to a position indicated by a reference numeral 14' and the holder body 10 shifts to the cassette using position thereof. The holder body 10 is constantly urged upward as viewed in FIG. 3 by some arrangement which is not shown. With the holder body 10 pushed downward as viewed in FIG. 3, a lock device which is not shown locks it in the cassette using position.

A projection 16 is provided on the bottom surface of the holder body 10. A pushing member 17 is urged by some arrangement in the direction of arrow 26. With the cassette holder in the cassette inserting position, if an attempt is made to incorrectly insert the cassette 1, the fore end of the cassette 1 abuts on the projection 16 to have the cassette prevented from being inserted in any incorrect manner. Meanwhile, in this instance, the upper surface of the cassette 1 is pushed down by the pushing member 17. The pushing member 17 is turnable on a shaft 19 and is urged by the force of a spring 18 to turn round in the direction of arrow 26 in such a way as to push the upper surface of the cassette 1 downward.

Whereas, in the conventional cassette loading device, the cassette is occasionally allowed to be incorrectly inserted against such an urging force. More specifically, when the cassette 1 is pushed against an inserting opening from below, the bottom of the cassette 1 is allowed to ride on the projection 16. Further, if the cassette holder body 10 is suddenly pushed down, the cassette is lifted away from the bottom plate of the cassette holder within the holder by the above-stated force of pushing the lid upward. In that event the cassette also might be allowed to ride on the projection 16.

In the case of this embodiment on the other hand, the lever 14 is provided with a projection 25 which is arranged as shown in FIG. 3 to abut on a projection 21 of the pushing member 17 during the movement of the cassette holder between the cassette inserting position and the cassette using position. With the holder reaching the cassette using position as shown in FIG. 3, the lever 14 turns round into the position 14' indicated by a broken line and the projection 25 is disengaged by this from the projection 21. With the embodiment arranged in this manner, the clockwise turning position of the cassette pushing member 17 is placed under the restriction jointly imposed by the projections 25 and 21 while the cassette holder is in the cassette inserting position and during the shifting movement of the holder between the cassette inserting position and the cassette using position. This positional restriction is removed while the cassette holder is in the cassette using position.

With the embodiment arranged in the manner as described in the foregoing, the pushing member 17 and the projection 25 of the lever 14 jointly serve to prevent incorrect insertion of the cassette. During the shifting movement of the cassette holder, the pushing member 17 effectively prevents the cassette 1 from being lifted up to ride on the projection 16. Further, while the cassette holder is in the cassette using position, the cassette 1 is positioned by virtue of a member which is secured to the chassis and is arranged to be inserted through openings 22a and 22b provided in the bottom plate of the casset holder. Therefore, this positioning arrangement obviates the necessity for extremely precise machining and also permits reduction in weight.

What is claimed is:

1. A cassette loading device comprising:
 (a) a cassette holding member arranged to hold a cassette which contains a recording medium therein, said holding member being shiftable between a first position in which said cassette is receivable by and removable from said holding member and a second position in which said holding member holds said cassette in a state permitting the use of said recording medium;
 (b) a pressing member which has a range of movement is urged to press said cassette against said cassette holding member when said holding member is holding said cassette in said first and second positions and when shifting from said first to second position; and
 (c) a movable member which is arranged to restrict the movable range of said pressing member when said cassette holding member is in said first position and to release its restricting of the movable range of said pressing member when said cassette holding member is in said second position.

2. A device according to claim 1, wherein said cassette holding member has a plate on which said cassette is to be placed and a projection which protrudes above said plate; and said pressing member is arranged to press said cassette against the surface of said plate on which said projection is provided.

3. A device according to claim 2, wherein said cassette is provided with a recess which is arranged to be opposed to said projection when said cassette is correctly held.

4. A device according to claim 3, wherein said movable member restricts the movable range of said pressing member in such a way as to prevent said cassette from moving away from said plate to an extent exceeding a given distance within said cassette holding member when said cassette holding member is in said first position.

5. A device according to claim 4, wherein the protruding extent of said projection from said plate is less than said given distance.

6. A device according to claim 1, further comprising a first revolving lever which is arranged to revolve for the purpose of shifting said cassette holding member between said first and second positions, said movable member being arranged to move in response to said first revolving lever.

7. A device according to claim 6, wherein said first revolving lever is turnably attached to said cassette holding member.

8. A device according to claim 7, wherein said movable member includes a boss which is attached to said first revolving lever.

9. A device according to claim 8, wherein said pressing member includes a projection which is caused to abut on said boss by the movement of said movable member when said holding member is in said first position.

10. A device according to claim 9, wherein said pressing member includes a boss which is arranged to be brought into a state of being hooked by said hook by the movement of said movable member when said holding member is in said first position.

11. A device according to claim 7, further comprising a second revolving lever which is turnably attached to said first revolving lever and has an end part; and wherein said movable member includes a hook which is attached to the end part of said second revolving lever.

12. A device according to claim 1, wherein said pressing member includes a revolving lever which is turnably attached to said cassette holding member so as to be able to undergo a turning movement and an urging member which urges said revolving lever to turn round in a given direction.

13. A device according to claim 12, wherein said movable member is arranged to restrict the turning movement of said revolving lever when said holding member is in said first position.

14. A cassette loading device comprising:
(a) a cassette holding member arranged to hold a cassette which contains a recording medium therein, said holding member being shiftable between a first position in which said cassette is receivable by and removable from said holding member and a second position in which said holding member holds said cassette in a state permitting the use of said recording medium;
(b) a pressing member which has a range of movement and is urged to press said cassette against said cassette holding member when said holding member is holding said cassette in said first and second positions and when shifting from said first to second position;
(c) a revolving member which is arranged to revolve for shifting said cassette holding member; and
(d) a restricting member which is secured to said revolving member and is arranged to restrict the movable range of said pressing member when said holding member is in said first position and to release its restricting of the movable range of the pressing member when said holding member is in said second position.

15. A device according to claim 14, wherein said cassette holding member has a plate on which said cassette is to be placed and a projection which protrudes above said plate; and said pressing member is arranged to press said cassette against the surface of said plate on which said projection is provided.

16. A device according to claim 15, wherein said cassette is provided with a recess which is arranged to be opposed to said projection when said cassette is correctly held.

17. A device according to claim 16, wherein said restricting member restricts the movable range of said pressing member in such a way as to prevent said cassette from moving away from said plate to an extent exceeding a given distance within said cassette holding member when said cassette holding member is in said first position.

18. A device according to claim 17, wherein the protruding extent of said projection from said plate is less than said given distance.

* * * * *